United States Patent [19]
Gebert et al.

[11] Patent Number: 5,589,060
[45] Date of Patent: Dec. 31, 1996

[54] FILTER FOR LIQUIDS, IN PARTICULAR INTERNAL-COMBUSTION ENGINE LUBRICANT OILS

[75] Inventors: Hans Gebert, Heilbronn-Bockingen; Rolf Möhle, Scheppach; Dietmar Sonntag, Remseck; Elke Bruss, Asperg; Dietwart Guntert, Sachsenheim; Hubert Müller, Stuttgart, all of Germany

[73] Assignee: Knecht Filterwerke GmbH, Stuttgart, Germany

[21] Appl. No.: 117,210

[22] PCT Filed: Mar. 16, 1992

[86] PCT No.: PCT/DE92/00228

§ 371 Date: Sep. 14, 1993

§ 102(e) Date: Sep. 14, 1993

[87] PCT Pub. No.: WO92/17262

PCT Pub. Date: Oct. 15, 1992

[30] Foreign Application Priority Data

Mar. 28, 1991 [DE] Germany ............... 41 10 307.6
Sep. 20, 1991 [DE] Germany ............... 41 31 353.4
Jan. 17, 1992 [DE] Germany ............... 42 01 041.1

[51] Int. Cl.⁶ ...................................... B01D 35/02
[52] U.S. Cl. .................. 210/130; 210/136; 210/232; 210/437; 210/438; 210/450; 210/455; 210/457; 210/493.2
[58] Field of Search ............. 210/437, 440–444, 210/450, 455, 457, 493.2, 130, 132, 136, 232, 438

[56] References Cited

U.S. PATENT DOCUMENTS

| | | | |
|---|---|---|---|
| 2,487,146 | 11/1949 | Laky | 210/350 |
| 2,642,187 | 6/1953 | Bell | 210/457 |
| 2,642,188 | 6/1953 | Layte et al. | 210/442 |
| 2,801,006 | 7/1957 | Hultgen et al. | 210/438 |
| 3,246,766 | 4/1966 | Pall | 210/457 |
| 3,268,077 | 8/1966 | Ball | 210/131 |
| 3,333,703 | 8/1967 | Scavuzzo | 210/232 |
| 3,397,786 | 8/1968 | Hultgren | 210/132 |
| 4,036,755 | 7/1977 | Dahm et al. | 210/438 |
| 4,094,791 | 6/1978 | Conrad | 210/248 |
| 4,502,955 | 3/1985 | Schaupp | 210/149 |
| 4,622,136 | 11/1986 | Karcey | 210/168 |
| 4,676,895 | 1/1987 | Davis | 210/184 |
| 4,935,135 | 6/1990 | Nakashima et al. | 210/234 |
| 4,985,142 | 1/1991 | Laycock et al. | 210/130 |

FOREIGN PATENT DOCUMENTS

| | | |
|---|---|---|
| 0314915 | 5/1989 | European Pat. Off. . |
| 1761220 | 2/1958 | Germany . |
| 1775841 | 8/1958 | Germany . |
| 1880149 | 7/1963 | Germany . |

(List continued on next page.)

*Primary Examiner*—Matthew O. Savage
*Attorney, Agent, or Firm*—Collard & Roe, P.C.

[57] ABSTRACT

A filter for liquids is disclosed herein. The filter includes a filter housing containing an exchangeable filter element. A support part is provided within the housing that is separable from the at least one filter element and extends at least partly centrally through the interior space of the filter element. A means is provided for releasably attaching one end of said support part to the filter housing. The housing includes first and second radial inner seals for separating a crude space surrounding an exterior of the filter element from a clean space located within interior of the filter element with the radial inner seals being mounted within the housing at the axial ends of the filter element. The filter element is folded star-shaped and sealed on the face side and provided on the inside at each of its two axial ends with a sleeve having an interior portion resting against the radial inner seals. The first radial seal includes an extension portion contained within a groove formed in the support part for separating the crude space from the clean space. An overflow valve is contained within the support part for establishing a flow connection between said crude space and said interior space when a pressure difference therebetween exceeds a predetermined value.

21 Claims, 5 Drawing Sheets

FOREIGN PATENT DOCUMENTS

| | | |
|---|---|---|
| 1152285 | 8/1963 | Germany . |
| 1889826 | 2/1964 | Germany . |
| 1436312 | 10/1969 | Germany . |
| 7104990 | 2/1971 | Germany . |
| 2362085 | 2/1977 | Germany . |
| 2824346 | 6/1978 | Germany . |
| 3306553 | 8/1984 | Germany . |
| 3317008 | 11/1984 | Germany . |
| 3019141 | 2/1985 | Germany . |
| 3414608 | 4/1985 | Germany . |
| 3409697 | 9/1985 | Germany . |
| 3416304 | 11/1985 | Germany . |
| 3444267 | 6/1986 | Germany . |
| 3443717 | 6/1986 | Germany . |
| 3446772 | 7/1986 | Germany . |
| 8418964 | 9/1986 | Germany . |
| 3543437 | 3/1987 | Germany . |
| 3630504 | 2/1988 | Germany . |
| 8714656 | 2/1988 | Germany . |
| 3704468 | 8/1988 | Germany . |
| 3913267 | 11/1989 | Germany . |
| 3921369 | 1/1990 | Germany . |
| 3903675 | 8/1990 | Germany . |
| 4022723 | 4/1991 | Germany . |
| 4036191 | 2/1992 | Germany . |
| 600207 | 4/1948 | United Kingdom . |
| 847563 | 9/1960 | United Kingdom . |
| 2192140 | 1/1988 | United Kingdom . |
| WO88/05335 | 7/1988 | WIPO . | ized by

FILTER FOR LIQUIDS, IN PARTICULAR INTERNAL-COMBUSTION ENGINE LUBRICANT OILS

The invention relates to a filter for liquids, in particular a lubricating-oil filter for an internal-combustion engine according to the introductory part of claim 1.

Such a filter for liquids is known, for example from U.S. Pat. No. 3,333,703. The filter for liquids shown there consists of a pot-shaped filter housing which, at its one end, is connected with a mounting head via a screw thread, and provided at its other open end with a screw-on housing cover. A filter element supported in the interior of the filter housing is provided with end disks and separates the crude space from the clean space. On the end disk of the filter element disposed opposite the housing cover, an overflow valve is mounted which, under certain operating conditions, establishes a connection between the crude space and the clean space. In connection with the other end disk of the filter element and the closed end of the filter housing, provision is made for a return check valve. A drawback with said design is, on the one hand, the waste disposal of the filter element, which consists of all sorts of different materials, and, on the other hand, that when the filter element is changed, at least the overflow valve is discarded because it is rigidly integrated in the end disk of the filter element.

A filter for liquids is known from U.S. Pat. No. 4,622,136 in connection with which a support part is supported in a separable filter housing, said support part receiving an annular filter element. Said annular filter element, which itself has to effect a separation between the crude and clean spaces by tightly resting against the support part, has to be pushed with its total length over the support part, which means damaging of the filter element and/or a weakening of the sealing effect cannot be excluded.

A lubricating oil filter with a separable housing is known from DE-OS 39 03 675, in connection with which a filter insert provided with face-side end disks is rigidly connected with the housing cover, the latter being screwable to the filter housing. With said design, however, no provision is made for a support part for receiving individual elements and extending at least partly centrally through the interior space of the filter element, from which support part the filter element is separable and thus exchangeable alone.

Therefore, the problem of the present invention is to find a filter for liquids with a constructionally simple structure in connection with which the filter element can be discarded as waste separately and in a way friendly to the environment, whereby the other functionally important individual parts can be reused.

The solution to said problem is obtained with a filter for liquids with the features according to the characterizing part of claim 1.

Advantageous developments of the invention are contained in the dependent claims.

Exemplified embodiments according to the invention are shown in the drawing, in which.

Figure 1:
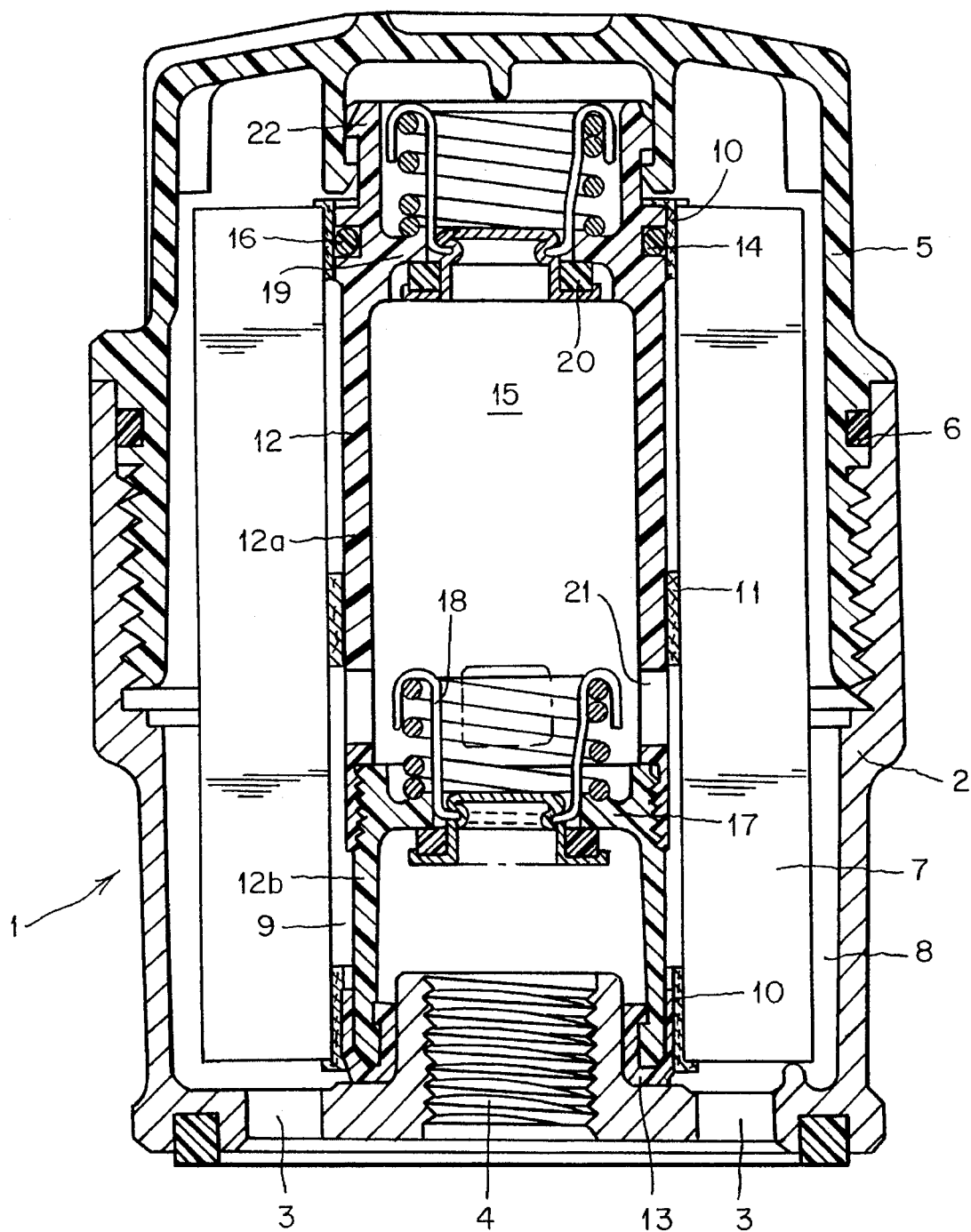
FIG. 1 shows a sectional view of the filter for liquids according to the invention.

A filter for liquids 1 according to FIG. 1 consists of a pot-shaped filter housing which, at its one end, is provided with the feed and discharge openings 3 and 4, respectively, and connectable, for example with a mounting head, and at its other end closed by a removable housing cover 5. Provision is made for a seal 6 between the screw-on housing cover 5 and the filter housing 2. A filter element 7 made of paper is designed as a star filter and pocket-glued and separates the crude space from the clean space 9. At each of its ends, it is provided on its inner circumference with a sleeve 10 made of strengthened paper. Furthermore, for stiffening the filter element 7, provision is made for a sleeve 11 in the center zone of the filter element 7. The manufacture of such a filter element from a single material assures that when the filter is changed, it can be discarded as waste in a way friendly to the environment.

In the filter housing, the filter element 7 is fixed by a sleeve-shaped support part 12 made of plastic, whereby the sleeves 10, which are rigidly joined with the filter element 7, rest against the seals 13, 14. The seal 13 is designed U-shaped and grips around the bottom end of the support part 12, so that a sealing is obtained at the same time between the crude and clean spaces 8 and 9, respectively, and the interior 15 of the support part. The ring-shaped seal 14 is supported in the top zone of the support part 12 in a matching groove 16. The support part 12 consists of the two individual parts 12a, b, which are screwed to each other via a thread. In an intermediate wall 17 of the lower individual part 12b of the support part 12, provision is made for a return check valve 18, so that on the one hand, the purified lubricating oil can flow off via the discharge opening 4 only starting with a predetermined pressure, and, on the other hand, running dry of the filter is avoided when the internal combustion engine is standing still. In an intermediate wall 19 of the top individual part 12 a of the support part 12, provision is made for an overflow valve 20, which, at a corresponding pressure difference, established a connection between the interior 15 of the support part 12 and the crude space 8. The top individual part 12a of the support part 12 has the openings 21, which establish a connection between the clean space 9 and the interior 15 of the support part 12. In addition, the individual part 12a can be engaged with the housing cover 5 via a snap connection 22, so that the housing cover 5 is screwed off from the filter housing 2, the filter element 7 is removed together with the support part 12.

With such a filter for liquids, it is assured in a constructionally simple way that when the filter element is changed, it can be disposed of as waste in a way friendly to the environment because of the single material used, and that the individual parts such as the support part 12, the valves 18, 20, and the seals 13, 14, which are required for the function, can be either reused or simply exchanged.

Figure 2:
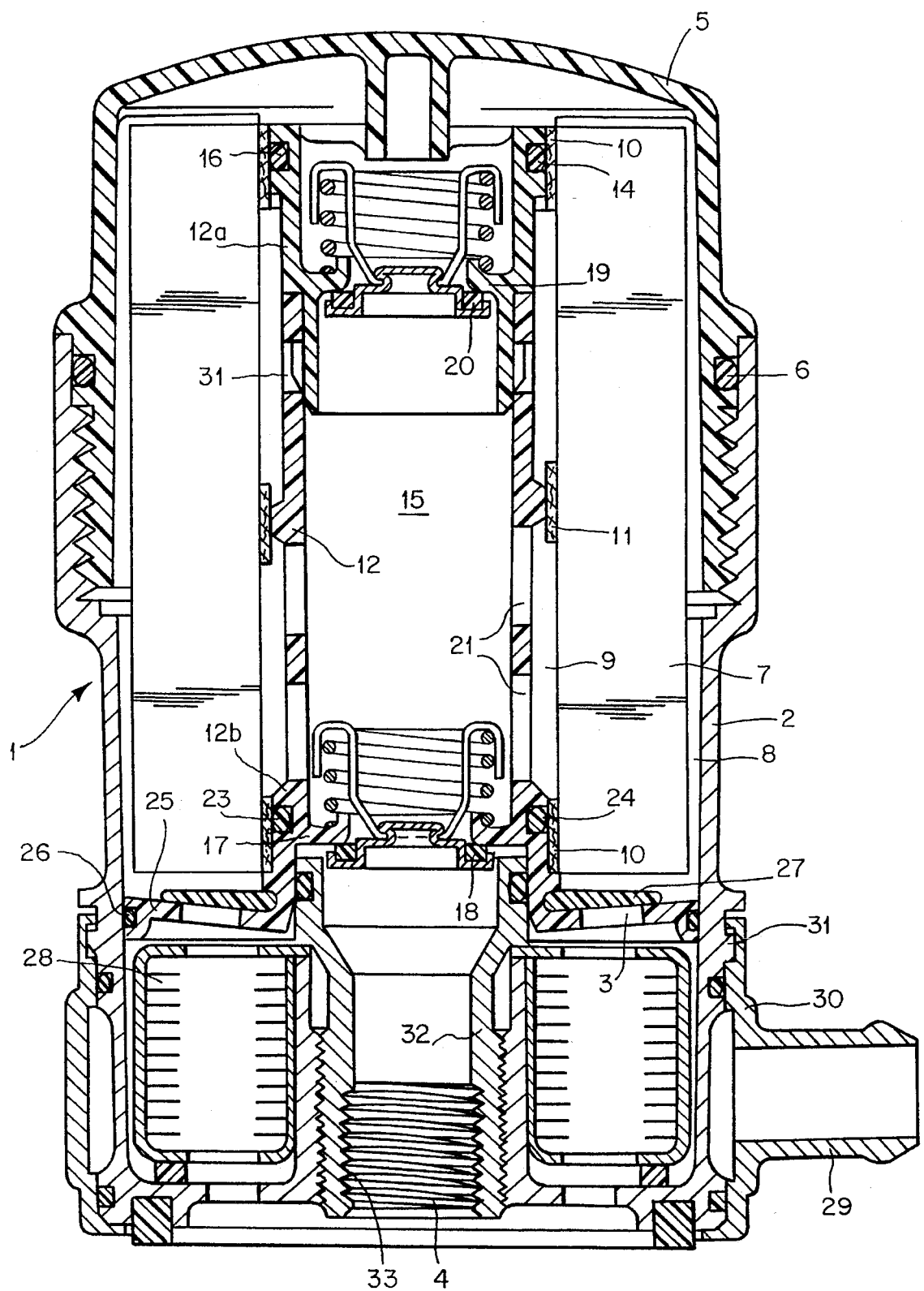
FIG. 2 shows a sectional view of a second embodiment of a filter for liquids according to the invention.

In the exemplified embodiment of a filter for liquids according to FIG. 2, the same reference numerals are used as in FIG. 1 for identical parts. These are:

---

Filter 1 for liquids

| Filter housing 2 | with screw-on housing cover 5 |
|---|---|
| Feed opening 3 | |
| Discharge opening 4 | |
| Seal 6 | |
| Filter element 7 | |
| Crude space 8 | |
| Clean space 9 | |
| Sleeve 10 | |
| Sleeve 11 | |

| Filter 1 for liquids | |
|---|---|
| Support part 12 | with the individual parts 12 a, b, which are connected with each other via a snap connection 31 |
| Seal 14 | |
| Interior 15 | of the support part 12 |
| Groove 16 | for the seal 14 |
| Intermediate wall 17 | for receiving the return check valve 18 |
| Intermediate wall 19 | for receiving the overflow valve 10 |
| Openings 21 | for connecting the clean space 9 with the interior 15 of the support part 12. |

The bottom individual part 12b of the support part 12, which also receives a return check valve 18, is designed differently as compared to the exemplified embodiment according to FIG. 1, and has a groove 24 extending all around for receiving a seal 23. The lower end of the individual part 12b changes into a disk 25 having the feed openings 3 and, via a seal 26, rests against the filter housing 2. A return check valve 27 closing the feed openings 3 is supported in the individual part 12b of the support part 12 as well.

The filter 1 for liquids is different from the exemplified embodiment according to FIG. 1 particularly in that a heat exchanger 28 (indicated only in rough outlines) is additionally integrated in the filter housing 2, said heat exchanger being acted upon by the cooling water of the internal combustion engine, whereby the feed and discharge of the cooling water takes place via a sleeve-shaped connection part 30, which is fitted with the short feed and discharge pipe 29 and rotatably supported (snap closure 31) on the housing part 2. For holding the heat exchanger 28, a sleeve-shaped connection element 32 made of metal is screwed into filter housing 2, which connection element, at its top end rests sealed against the individual part 12b of the support part 12, and which, at its bottom end, has an inside thread 33 for connecting the filter 1 for liquids with the internal combustion engine via known means.

The properties and advantages stated with respect to the exemplified embodiment according to FIG. 1 apply to the exemplified embodiment according to FIG. 2 as well.

Figure 3:
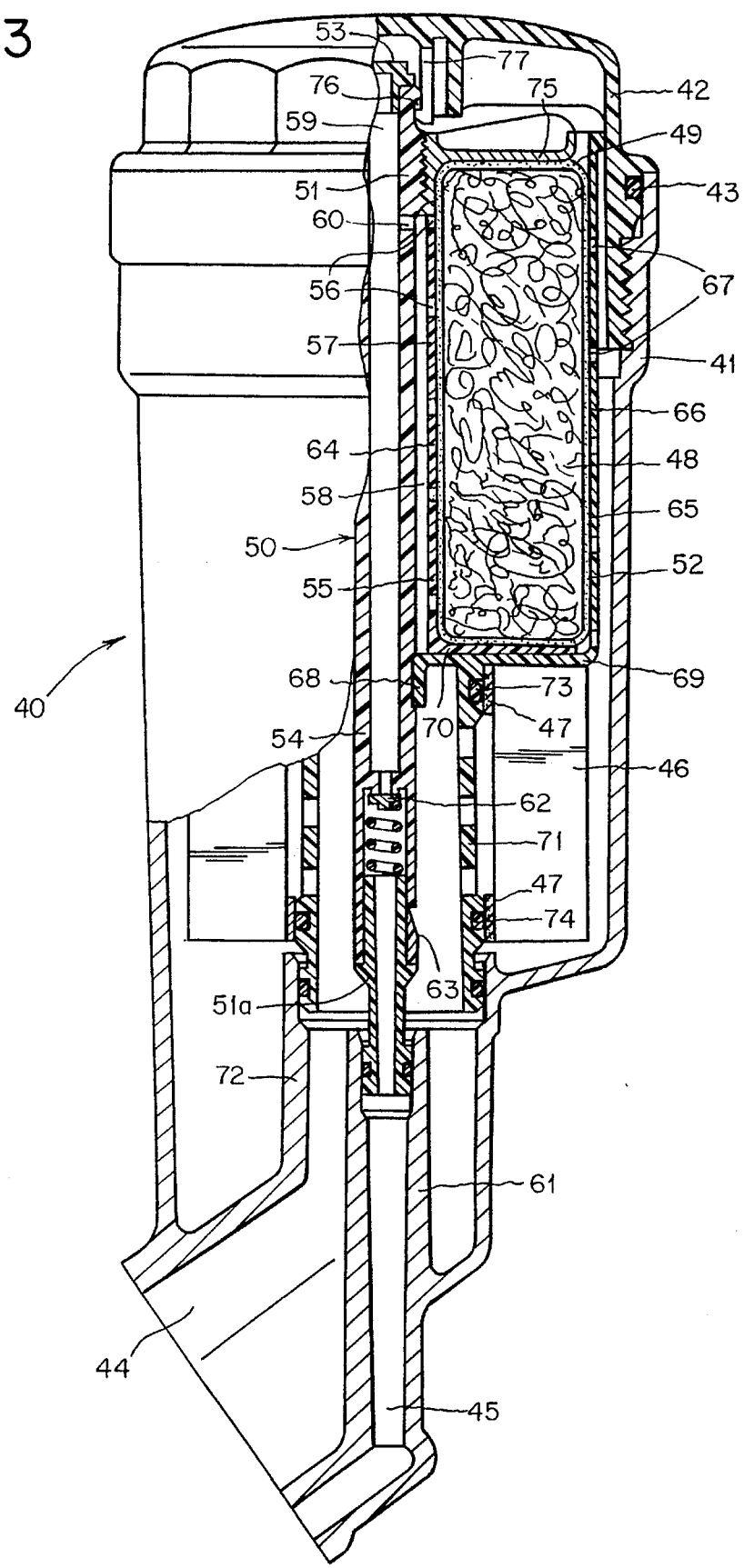
FIG. 3 shows a partially sectional view of a third embodiment of a filter for liquids according to the invention.

Another exemplified embodiment according to FIG. 3 contains a filter 40 for liquids which is designed as a primary/secondary flow filter. The filter 40 for liquids, which is arranged upright, contains a pot-shaped filter housing 41 made of aluminum pressure die-cast and a screw-on housing cover 42 made of plastic, between which provision is made for a seal 43. At the closed end of the filter housing 41, provision is made for feed and discharge ducts for the lubricating oil, whereby provision is made for a discharge duct 44 leading to the points of lubrication for the cleaned lubricating oil in the primary flow, and for a discharge duct 45 leading into the crank space for the cleaned lubricating oil in the secondary flow.

A primary-flow filter element 46 is made of paper (like the filter element according to FIGS. 1 and 2) and designed in the form of a star filter with glued pockets, and at each of its ends rigidly connected on the inside by glueing with a sleeve 47 mde of strengthened paper.

A secondary-flow filter element 48 consists of stuffed cotton, which is received by an endless, ring-shaped hose 49 made of cotton. Since the two filter elements 46, 48 each consist of single materials, they can be disposed of as waste in a simple way, also separately, in a manner friendly to the environment.

For holding the filter elements 46, 48 in the interior of the filter housing 41, provision is made for a support part 50 made of plastic, which consists of the individual parts 51, 51a, 52, 53, which are manufactured by the injection molding process and welded or glued to each other. The individual part 51 consists of a central tube 54, to which in its upper zone, an L-shaped sleeve 55 is shaped by molding in one piece in such a way that a clean space 58 for the cleaned lubricating oil of the secondary-flow filter element 48 is formed between the outer wall of the tube 54 and the longer leg 57 of the L-shaped sleeve 55, said longer leg having the openings 56. Said clean space 58 is connected with the interior 59 of the tube 54 via a throttle bore 60 disposed in the upper zone of the tube 54, so that the upper zone of the tube 54 acts at the same time as a standpipe. At its lower open end, the tube 54 is sealingly supported in a short pipe 61 receiving the discharge duct 45 for the cleaned lubricating oil of the secondary-flow filter, whereby for receiving a return check valve 62, the lower end of the tube 54 is divided in two parts and the individual part 51 a is connected with the individual part 51 via a snap connection 63.

In order to obtain a ring-shaped pot part 64 for receiving the secondary-flow filter element 48, the individual part 52 consists of a Z-shaped angle part 65 with legs of different length, of which angle part the one leg 66 is provided with the openings 67 and forms the outer wall of the ring-shaped pot part 64, and of which the shorter leg 68 rests against the tube 54, and of which the center bridge 69 rests against the short leg 70 of the L-shaped sleeve 55, whereby said parts are welded to each other. A sleeve-shaped extension 71 is shaped by molding on the center bridge 69 as one piece, said extension being sealingly supported in a short pipe 72 of the filter housing 2 and serving for receiving the primary-flow filter element 46, whereby the primary-flow filter element 46 rests via its sleeves 47 rests against the seals 73, 74, which are supported in matching grooves.

In order to close the ring-shaped pot part 64 receiving the secondary-flow filter and to prestress the secondary-flow filter element 48, a cover 75 designed as a type of winged nut is screwed together with the upper zone of the individual part 51 of the support part 50. Such termination and such prestress may be realized also, for example via a cover part with a spring and bayonet lock.

A snap device 76 mounted on the top end of the individual part 51 of the support part 50 engages in a matching counterpart 77 mounted on the housing cover 42, so that when the housing cover 42 is removed, the support part 50 together with the filter elements 46, 48 is removed at the same time. With this, the individual part 51 a engaging the short pipes 61, 72 and the sleeve-shaped extension 71 control the discharge ducts 44, 45 open, so that the oil present in the filter can drain off.

Figure 4:
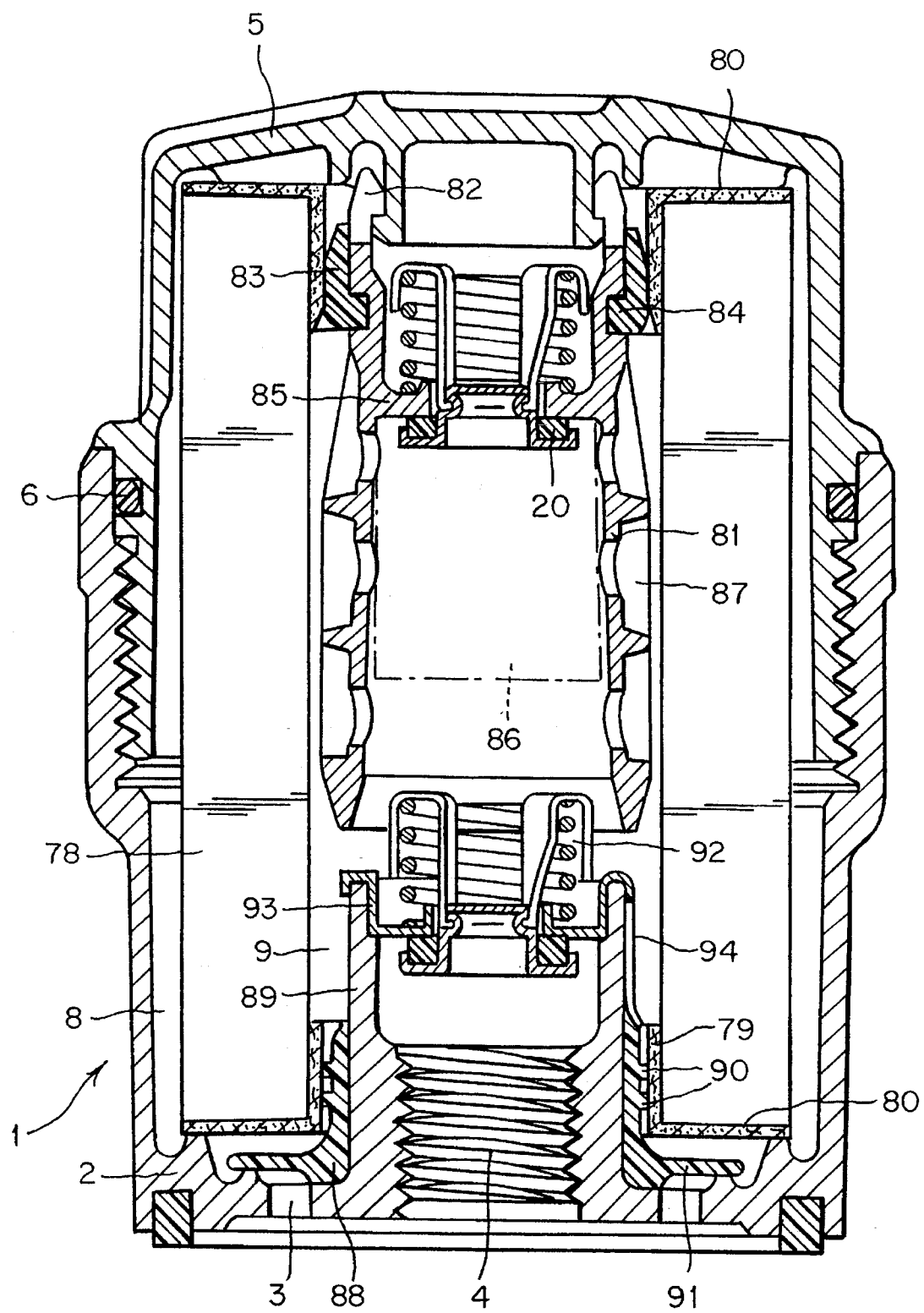
FIG. 4 shows a sectional view of a fourth embodiment of a filter for liquids according to the invention.
Figure 5:
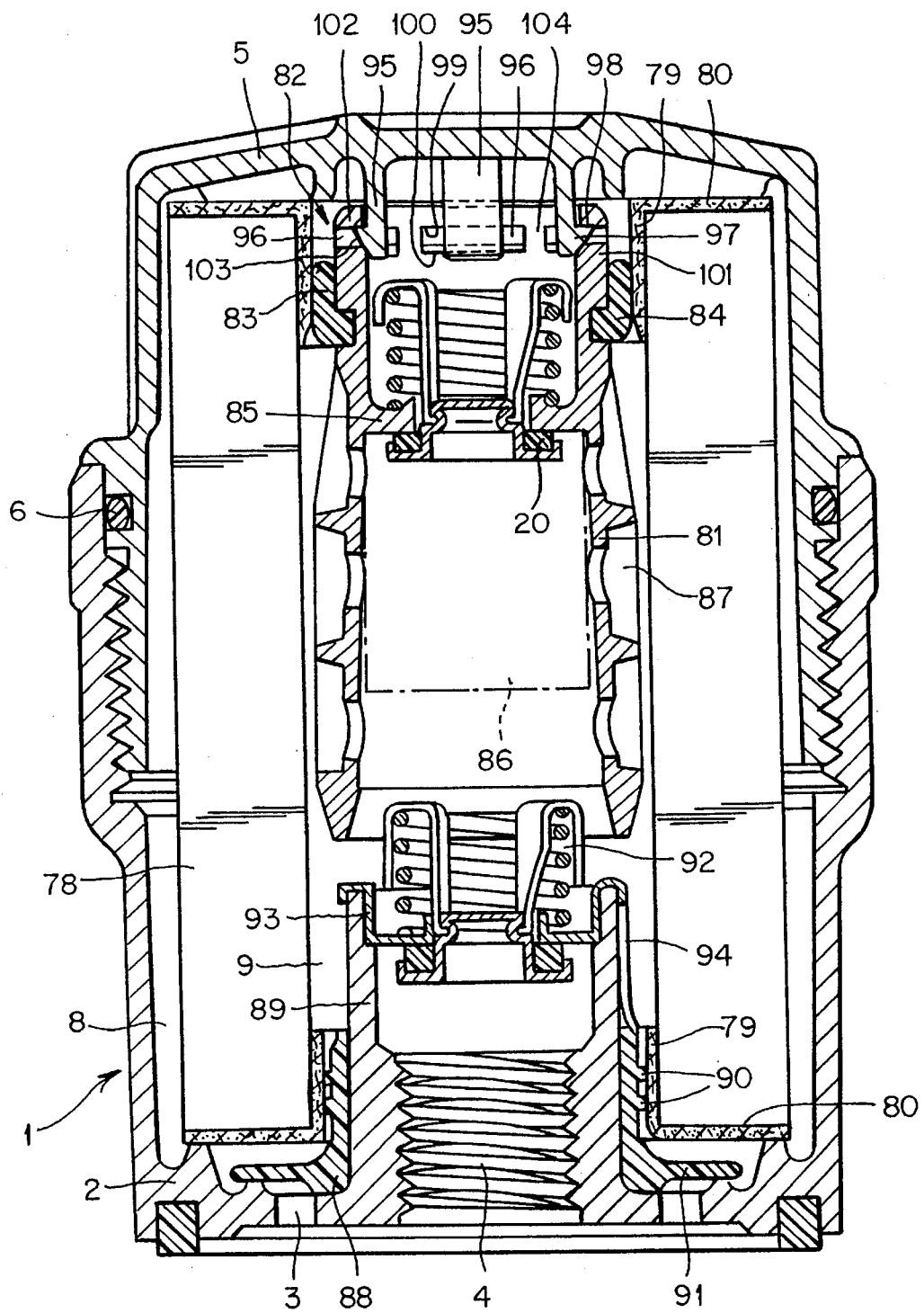
FIG. 5 shows a sectional view of a fifth embodiment of a filter for liquids according to the invention.

With other exemplified embodiments of a filter for liquids according to FIGS. 4 and 5, the same reference numerals as in FIGS. 1 and 2, respectively, are used for identical parts.

A star-shaped filter element 78 manufactured from paper is provided at each of its ends on its inner circumference with a sleeve 79 made of strengthened paper, on which a paper end disk 80 is shaped by molding in one piece, sealingly closing the axial face edges of the filter element 78. By manufacturing such a filter element from a single material, it is assured that said element can be disposed of as waste in an environment-friendly way when the filter is changed.

For receiving a part of the individual elements, a support part 81 is fixed on the housing cover 5 by means of the snap connection 82. A first radial seal 83 separating the crude space 8 from the clean space 9 is supported on the support part 81, whereby, for example, an extension 84 engages in a groove of the support part 81. In an intermediate wall 85 of the support part 81, an overflow valve 20 is provided which, at a corresponding pressure difference, establishes a connection between the crude space 8 and the clean space 9. In the interior of the support part 81, additional provision can be made for a sieve 86. Furthermore, for supporting the filter element 78, axially extending support ribs 87 are shaped by molding on the support part 81, distributed over the outer circumference of the support part.

For receiving a second radial seal 88 separating the crude space 8 from the clean space 9, a tubular short pipe 89 projecting into the interior of the filter for liquids is molded as one piece onto the filter housing 2 in the center. Via the sealing lips 90 molded onto said radial seal 88, the latter can rest against the sleeve 79 arranged on the filter element 78. Furthermore, a return check valve 91 blocking the feed opening 3 can be joined with the radial seal 88, forming one piece with the latter. The return check valve 91 can be additionally elastically prestressed, for example via a spring metal sheet plate supported in the short pipe 89. In order to prevent the clean space 9 from running dry during an operational standstill, a return check valve 92 is fastened on the short pipe 89, whereby its ring disk 93 is provided with the tongues 94, the latter being distributed over the circumference and serving for securing the position of the radial seal 88.

The difference between FIG. 4 and FIG. 5 is that in FIG. 5, the snap connection 82 is designed to be releasable. The filter of FIG. 5 contains sieve 86.

The releasable snap connection between the housing cover 5 and the support part 81 comprises the four hook-shaped lugs 95, which are circumferentially evenly distributed on the inner bottom of the cover and which project into the interior of the housing and engage in matching, closed recesses 96 of the support part 81, said recesses being provided at that end of support part 81 that faces the cover 5. After the lugs 95 have snapped in, a cam 97 of each lug 95 rests with its sharp edge against a sharp-edged clawing side 99 of the recess 96 in the locking direction, so that an unintentional detachment of the support part 81 from the housing cover 5 is impossible even under extreme pressure conditions in the interior of the filter. The other three sides of the recess 96 may be provided in the releasing direction with the bevelled surfaces 100 depending on which type of release (turning or axial displacement) is intended. At the top end 101 of the support part 81, the recesses 96 are molded in in such a way that a ring 102, the latter extending all around, is still present on the support part 81.

When the cover 5 and the support part 81 are mounted, the support part 81 is pushed with its ring 102 over a molded incline 103 of the hook-shaped lugs 95 in the direction of the bottom of the cover in such a way that the cams 97 of the lugs 95 subsequently lock in the recesses 96.

When the cover 5 and the support part 81 are dismantled, the support part 81 is first pushed in the direction of the cover 5, so that the cams 97 of the lugs 95 are guided across the bevelled surfaces 100 of the recesses 96 and come to rest on the inside against the end 101 of the support part 81. Subsequently, the support part 81 is turned to such an extent that when the support part 81 is subsequently pulled off, the lugs 95 will slide across the guide bridges 104, the latter being disposed between the recesses 96 and connecting the end 101 of the support part 81 with the ring 102 of the support part 81, without locking in the recesses 96.

With the shown exemplified embodiment of such a filter for liquids, a separate and environmentally friendly waste disposal is assured when the filter is changed due to the utilization of single materials for the individual filter elements.

Furthermore, the special constructional embodiment of the support part receiving the functionally required individual parts assures that the exchangeability and/or reuse of each individual part is possible, i.e., for example, the support part can be completely exchanged or reused, only the seals and/or the filter elements can be replaced separately, or the valuable filter housing can be reused per se because no other individual parts (wear parts) are rigidly integrated in said housing. Such a design of the filter for liquids permits a use according to the unit construction system, so that it is even possible to omit, for example the one or other valve without any further measures.

We claim:

1. Filter for liquids, comprising a filter housing including an inlet means and an outlet means, a cover separable from said housing, said housing containing at least one ring-shaped, exchangeable filter element separable from said housing having two axial ends and having an interior space, each said axial end defining an inside and a face side;

a support part within said housing, said support part being separable from the at least one filter element and extending at least partly centrally through the interior space of the filter element, and said support part being supported on the cover by a support means;

first and second radial inner seals separating a crude space surrounding an exterior of said filter element from a clean space contained with the interior space of the filter element, and said radial inner seals mounted within said filter element at the axial ends of the filter element;

said separable filter element being folded star-shaped and sealed on each said face side by an end disk and provided on the inside at each of its two axial ends with a sleeve having a radial inner surface for resting against a radial outer surface the radial inner seals;

said radial inner seals comprising said first radial seal positioned on the support part for separating the crude space from the clean space and said second radial inner seal positioned on said outlet means; and an overflow valve contained within the support part for establishing a flow connection between said crude space and said interior space when a pressure difference therebetween exceeds a predetermined value.

2. Filter for liquids according to claim 1, further comprising a sieve contained within the support part.

3. Filter for liquids according to claim 1, further comprising an axially extending longitudinal axis in said support part;

circumferentially distributed, axially extending support ribs extending along said longitudinal axis and molded on an exterior surface of the support part for supporting the filter element.

4. Filter for liquids according to claim 1, further comprising wherein said outlet means comprises a tubular short pipe projecting into the interior Space of the filter element said pipe being centrally shaped by molding on the filter housing for receiving said second radial inner seal separating the crude space from the clean space.

5. Filter for liquids according to claim 4, wherein said second radial inner seal lips extending all around said second radial seal.

6. Filter for liquids according to claim 4, wherein said housing has feed openings, and wherein there is a return check valve for closing the feed openings, said return check valve including a portion that rests against the short pipe on the outside, whereby said return check valve prevents flow out of said crude space via said feed openings.

7. Filter for liquids according to claim 6, wherein said portion of the return check valve includes the second radial inner seal.

8. Filter for liquids according to claim 4, further comprising a return check valve within said short pipe for preventing flow into said interior space via said pipe.

9. Filter for liquids according to claim 1, further comprising housing cover for the filter housing, and wherein said support means includes a releasable snap connection means on the support part for detachably connecting the housing cover to the support part.

10. Filter for liquids according to claim 9, wherein the releasable snap connection means comprises:

at least two flexible, hook-shaped lugs on the housing cover; and means defining closed recesses on support part which engage said lugs;

each means defining a closed recess has in a locking direction at least one sharp-edged clawing side means;

each means defining a closed recess has a bevelled surface and each lug has in a direction of release at least one molded incline; and guide bridge means for the lugs are circumferentially disposed between the recesses.

11. Filter for liquids according to claim 10, wherein said housing cover has an inner bottom;

said hook-shaped lugs projecting on the cover inner bottom into the interior of the housing engage in said closed recesses in the support part at the end of the support part facing the cover;

said lugs each having a cam having a sharp edge, whereby the cams of the lugs in each case rest with their sharp edge in the locking direction against the sharp-edge clawing side means of each recess.

12. Filter for liquids according to claim 10, wherein there are four circumferentially distributed lugs.

13. Filter for liquids according to claim 1, further comprising:

wherein said outlet means comprises a tubular short pipe projecting into the interior space of the filter element, said pipe being centrally shaped by molding on the filter housing for receiving said second radial inner seal separating the crude space from the clean space; and wherein said support means includes means for detachably connecting the housing to the support part.

14. Filter for liquids according to claim 1, further comprising a housing cover for the filter housing wherein said support means includes means for detachably connecting the housing cover to the support part, a tubular short pipe projecting into the interior space of the filter element, and a return check valve within said short pipe for preventing flow into said interior space via said pipe.

15. Filter for liquids according to claim 1, further comprising wherein said outlet means comprises a tubular short pipe projecting into the interior space of the filter element, said pipe being centrally shaped by molding on the filter housing for receiving said second radial inner seal separating the crude space from the clean space; and, wherein said support means includes a releasable snap connection means on the support part for detachably connecting the housing cover to the support part.

16. Filter for liquids according to claim 15, further comprising a return check valve within said short pipe for preventing flow into said interior space via said pipe.

17. Filter for liquids, comprising a filter housing including an inlet means and an outlet means, a cover separable from said housing, said housing containing at least one ring-shaped, exchangeable filter element separable from said housing having two axial ends and having an interior space, each said axial end defining an inside and a face side;

a support part within said housing, said support part being separable from the at least one filter element and extending at least partly centrally through the interior space of the filter element, and said support part being supported on the cover by a support means;

first and second radial inner seals separating a crude space surrounding an exterior of said filter element from a clean space contained with the interior space of the filter element, and said radial inner seals mounted within said filter element at the axial ends of the filter element;

said separable filter element being folded star-shaped and sealed on each said face side by an end disk and provided on the inside at each of its two axial ends with a sleeve having a radial inner surface for resting against a radial outer surface the radial inner seals;

said radial inner seals comprising said first radial seal positioned on the support part for separating the crude space from the clean space and said second radial inner seal positioned on said outlet means; and an overflow valve contained within the support part for establishing a flow connection between said crude space and said interior Space when a pressure difference therebetween exceeds a predetermined value;

wherein said outlet means comprises a tubular short pipe projecting into the interior space of the filter element, said pipe being centrally shaped by molding on the filter housing for receiving said second radial inner seal separating the crude space from the clean space; and a return check valve within said short pipe for preventing flow into said interior space via said pipe.

18. Filter for liquids, comprising a filter housing including an inlet means and an outlet means, a cover separable from said housing, said housing containing at least one ring-shaped, exchangeable filter element separable from said housing having two axial ends and having an interior space, each said axial end defining an inside and a face side;

a support part within said housing, said support part being separable from the at least one filter element and extending at least partly centrally through the interior space of the filter element, and said support part being supported on the cover by a support means;

first and second radial inner seals separating a crude space surrounding an exterior of said filter element from a clean space contained with the interior space of the filter element, and said radial inner seals mounted within said filter element at the axial ends of the filter element;

said separable filter element being folded star-shaped and sealed on each said face side by an end disk and provided on the inside at each of its two axial ends with a sleeve having a radial inner surface for resting against a radial outer surface the radial inner seals;

said radial inner seals comprising said first radial seal positioned on the support part for separating the crude space from the clean space and said second radial inner seal positioned on said outlet means; and an overflow valve contained within the support part for establishing a flow connection between said crude space and said interior space when a pressure difference therebetween exceeds a predetermined value; and wherein said support means includes means for detachably connecting the housing cover to the support part.

19. Filter for liquids, comprising a filter housing including an inlet means and an outlet means a cover separable from said housing, said housing containing at least one ring-shaped, exchangeable filter element separable from said housing having two axial ends and having an interior space, each said axial end defining an inside and a face side;

a support pare within said housing, said support part being separable from the at least one filter element and extending at least partly centrally through the interior space of the filter element, and said support part being supported on the by a support means;

first and second radial inner seals separating a crude space surrounding an exterior of said filter element from a clean space contained with the interior Space of the filter element, and said radial inner seals mounted within said filter element at the axial ends of the filter element;

said separable filter element being folded star-shaped and sealed on each said face side by an end disk and provided on the inside at each of its two axial ends with a sleeve having a radial inner surface for resting against a radial outer surface the radial inner seals;

said radial inner seals comprising said first radial seal positioned on the support part for separating the crude space from the clean space and said second radial inner seal positioned on said outlet means; and an overflow valve contained within the support part for establishing a flow connection between said crude space and said interior space when a pressure difference therebetween exceeds a predetermine value;

wherein said outlet means comprises a tubular short pipe projecting into the interior space of the filter element, said pipe being centrally shaped by molding on the filter housing for receiving said second radial inner seal separating the crude space from the clean space; and a return check valve within said short pipe for preventing flow into said interior space via said pipe; and, wherein said support means includes means for detachably connecting the housing cover to the support part.

20. Filter for liquids, comprising a filter housing including an inlet means and an outlet means, a cover Separable from said housing, said housing containing at least one ring-shaped, exchangeable filter element separable from said housing having two axial ends and having an interior space, each said axial end defining an inside and a face side;

a support part within said housing, said support part being separable from the at least one filter element and extending at least partly centrally through the interior space of the filter element, and said support part being supported on the cover by a support means;

first and second radial inner seals separating a crude space surrounding an exterior of said filter element from a clean space contained with the interior Space of the filter element, and said radial inner seals mounted within said filter element at the axial ends of the filter element;

said separable filter element being folded star-shaped and sealed on each said face side by an end disk and provided on the inside at each of its two axial ends with a sleeve having a radial inner surface for resting against a radial outer surface the radial inner seals;

said radial inner seals comprising said first radial seal positioned on the support part for separating the crude space from the clean space and said second radial inner seal positioned on said outlet means; and an overflow valve contained within the support part for establishing a flow connection between said crude space and said interior space when a pressure difference therebetween exceeds a predetermined value; and, wherein said support means includes a releasable snap connection means on the support part for detachably connecting the housing cover to the support part.

21. Filter for liquids, comprising a filter housing including an inlet means and an outlet means, a cover separable from said housing, said housing containing at least one ring-shaped, exchangeable filter element separable from said housing having two axial ends and having an interior space, each said axial end defining an inside and a face side;

a support part within said housing, said support part being separable from the at least one filter element and extending at least partly centrally through the interior space of the filter element, and said support part being supported on the cover by a support means;

first and second radial inner seals separating a crude space surrounding an exterior of said filter element from a clean space contained with interior space of the filter element, and said radial inner seals mounted within said filter element at the axial ends of the filter element;

said separable filter element being folded star-shaped and sealed on each said face side by an end disk and provided on the inside at each of its two axial ends with a sleeve having a radial inner surface for resting against a radial outer surface the radial inner seals;

said radial inner seals comprising said first radial seal positioned on the support part for separating the crude space from the clean space and said second radial inner seal positioned on said outlet means; and an overflow valve contained within the support part for establishing a flow connection between said crude space and said interior space when a pressure difference therebetween exceeds a predetermined value;

wherein said outlet means comprises a tubular short pipe projecting into the interior space of the filter element, said pipe being centrally shaped by molding on the filter housing for receiving said second radial inner seal separating the crude space from the clean space;

a return check valve within said short pipe for preventing flow into said interior space via said pipe; and, wherein said support means includes a releasable snap connection means on the support part for detachably connecting the housing cover to the support part.

* * * * *